D. N. BACOT & D. D. ARDEN.
SAFETY AIR BRAKE APPLIANCE FOR RAILWAY CARS.
APPLICATION FILED JULY 27, 1908.
912,932.
Patented Feb. 16, 1909.
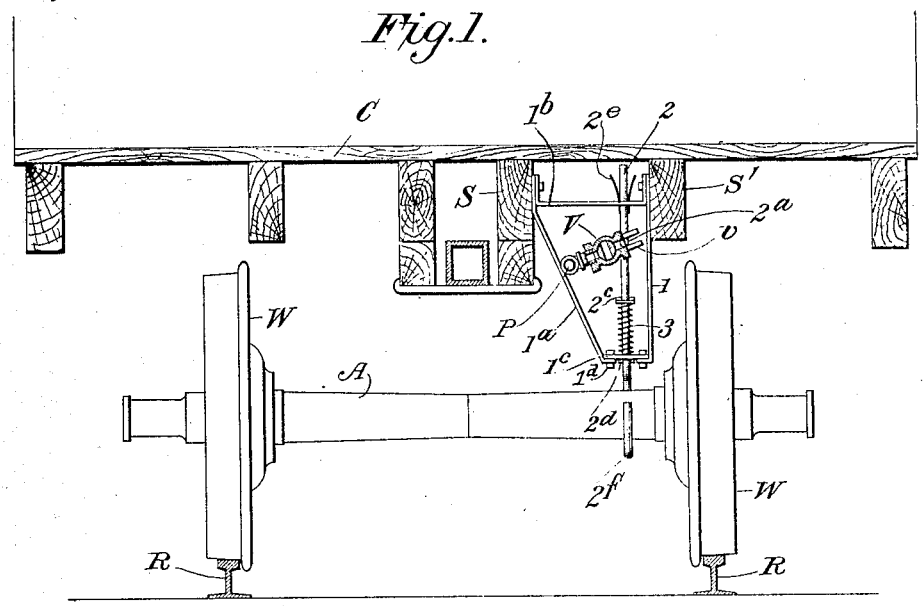
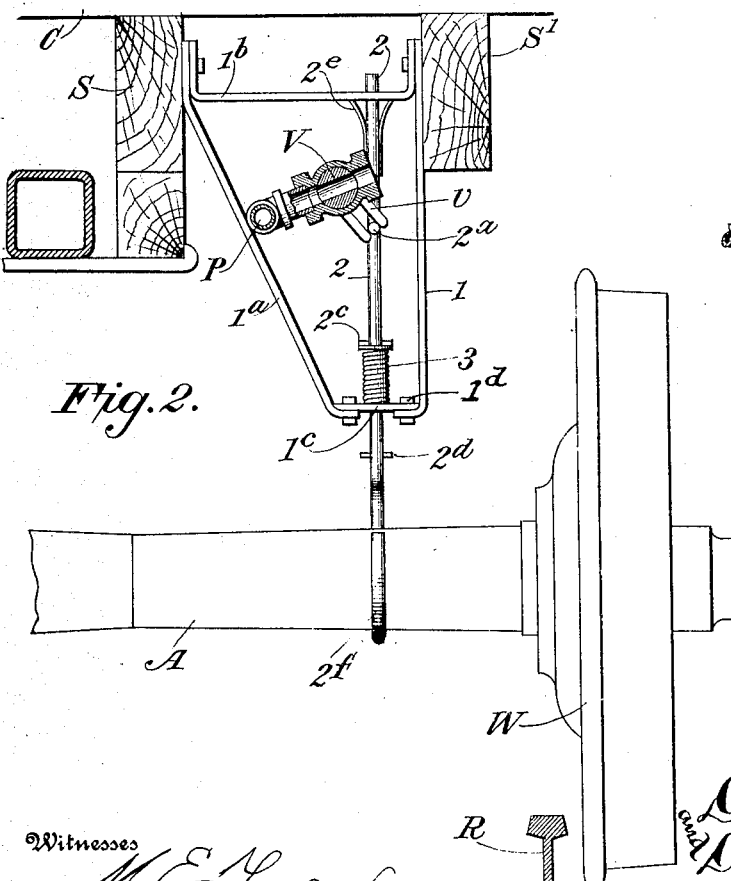
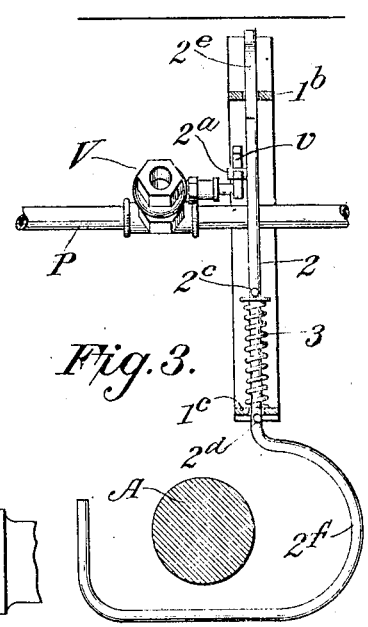
Witnesses
M. E. Fowler
James R. Mansfield
Inventors
Daniel N. Bacot
Daniel D. Arden
By Alexander Lowell
Attorneys

UNITED STATES PATENT OFFICE.

DANIEL N. BACOT AND DANIEL D. ARDEN, OF STATESBORO, GEORGIA; SAID BACOT ASSIGNOR TO SAID ARDEN.

SAFETY AIR-BRAKE APPLIANCE FOR RAILWAY-CARS.

No. 912,932.     Specification of Letters Patent.     Patented Feb. 16, 1909.

Application filed July 27, 1908. Serial No. 445,547.

*To all whom it may concern:*

Be it known that we, DANIEL N. BACOT and DANIEL D. ARDEN, both of Statesboro, Bulloch county, Georgia, have invented certain new and useful Improvements in Safety Air-Brake Appliances for Railway-Cars; and we hereby declare that the following is a full, clear, and exact description thereof, reference being had to the accompanying drawings, which form part of this specification.

This invention relates to railway safety appliances, and has particular reference to cars equipped with air brakes. Its object is to provide an attachment for such cars whereby the brakes will be automatically applied in case of the derailment of a car wheel or truck, or the breaking of an axle, so that the train can be brought to a stop by the application of the brakes without the necessity of any manual operation thereof.

Another object of the invention is to so construct said attachment that any dangerous depressions in the track can be detected thereby as said device will cause a momentary service application of the air brake, thereby notifying the engineer of the defect in the track, even if the train should pass safely thereover; and in event of a break in a rail over which the truck may pass without actual derailment, a service application of the air may be made, so that the attention of the engineer will be called to the defect in the track.

The present invention therefore embodies a novel mechanism adapted to be attached to a car in such position that upon derailment of a car truck, or wheels, or breakage of an axle, the air pipe may be fully vented so as to apply the emergency brake to the train and bring it to a stop before a serious wreck occurs; and also whereby if a truck finds a broken place in the track or dangerous depression therein, the device will operate to momentarily release the air and thus give a service application of the brake. In practice we propose to equip each axle of the truck with such a device, and to locate the attachments for adjacent axles at alternate sides of the truck, so that a defect in either rail will be detected by at least one of the devices, and if either axle is derailed the emergency brake will be applied.

We will now describe the invention in connection with the accompanying drawings in which—

Figure 1 is a detail transverse section of a car and truck showing the device in front elevation and partly in section, also showing the position of the parts when the axle, wheels and truck are in perfect condition, at which time the parts embodying the invention are inert or inactive. Fig. 2 is a similar view showing the position of the parts caused by derailment of the axle, and resulting in making an emergency application of the brake. Fig. 3 is a detail.

In the drawings we have not shown any details of the brake mechanism, as it is well understood and the invention is adapted to be used with any of the standard air-brake equipments on railway cars. Neither have we shown any particular construction of car or truck, as the invention is adapted to be used with any standard forms thereof.

The following description will enable any one skilled in the art to readily comprehend the invention and apply the same to a railway rolling stock.

In the drawings, A represents one of the car axles, W the wheels; R the ordinary track rails; C the bottom of a car; S one of the center car sills, and S' one of the intermediate car sills.

P designates an air pipe, connected with the air brake service pipes of the train (not shown); and V a venting valve connected with this pipe, and having a bifurcated or slotted lever $v$ on its stem.

Suspended preferably from the car sills S, S', or other convenient portion of the car, is a frame or hanger, which may consist of two side members 1, $1^a$, an upper member $1^b$ and a lower member $1^c$; which latter may be conveniently connected to the lower ends of the side members 1, $1^a$, by bolts $1^d$. The members $1^b$, $1^c$, are provided with vertically alined apertures in which is guided a vertical rod 2, which is provided with a pin or bolt $2^a$ engaging the bifurcated valve-lever $v$, and said rod is normally upheld by a spring in position to hold and keep valve V closed. As shown a helical spring 3 is interposed between the member $1^c$ and a pin $2^c$ transfixing rod 2. The upward movement of rod 2 is limited by a cotter $2^d$ in the rod below member $1^c$.

The rod 2 is provided at its upper end with outwardly flared spring catches $2^e$ which diverge at their upper ends above the bar $1^d$, their lower ends being attached to the rod below said bar. The rod 2 extends below the axle A and is provided with a lateral extension or loop 2$^f$ which passes below and under the adjacent axle, as shown in Fig. 3 of the drawings, the curved portion 2$^f$ of rod 2 being so formed that it will not contact with the axle A when the axle and car are in normal position, and will also allow the usual relative movements of the car and axle when in motion and when turning curves. But if there is any unusual and excessive change in the distance between the axle and the car-sills sufficient to cause the underside of the axle to contact with the curved part 2$^f$ of the rod, the latter will be depressed and more or less open the valve V.

The parts are so located and adjusted that if the truck should be derailed—(which would cause a very abnormal separation between the axle and the car body)—the rod 2 would be depressed by the axle, as indicated in Fig. 2, thereby fully opening the valve V and quickly venting the air in the brake system, causing an emergency application of the brakes and bringing the train to a stop.

In practice we propose to apply one of these devices to each axle of a car,—so if any truck equipped with such device is derailed an emergency application of the brake will be made and the train will be quickly brought to a stand still. Upon such an untoward depression of the rod the spring catches 2$^e$ will be pulled below member 1$^b$ and will catch thereunder and hold rod 2 in lowered position, and spring 3 under compression as indicated in Fig. 2, keeping the valve open. If the drop of the axle is so great as to more than close spring 3 the pin 2$^c$ will break and the rod 2 can be pulled through the spring and out of the member 1$^c$ without injury to the valve V, the air brake system, or the main portion of the frame. The member 1$^c$ is preferably made removable as indicated in the drawings, so that in event of such stripping of the rod 2 from the frame, the bar 1$^c$ can be easily removed and the parts readjusted or repaired with facility.

The device is also useful as a detector, for in case of a break in the rail or dangerously low place in the track over which the truck can however pass without derailment, the excessive depression of the axle in passing such spot would depress rod 2 sufficiently to momentarily open the valve V and give a service application of the brake, thereby signaling the engineer and calling his attention to the fact that there is a defect in the track; and as this action would be repeated by every axle equipped with this device, the train could be gently brought to a stop, and the engineer would be unmistakably notified that the track was in a dangerous condition.

Having described our invention what we claim as new and desire to secure by Letters Patent is:

1. A safety air-brake appliance for cars comprising a venting valve connected with the air brake system of the car, a vertically movable rod suspended adjacent the valve and having an extension underlying the car axle, means for normally upholding the rod and loose connections between said rod and the valve stem whereby excessive drop of the car axle will through said extension cause the rod to actuate the valve.

2. In combination, a venting valve connected with the air-brake system of a car, a frame adjacent the valve, a vertically movable rod in said frame, connections between said rod and the valve stem, a spring for upholding the rod in position to keep valve normally closed and means whereby excessive drop of the car axle will cause the rod to actuate the valve.

3. In a device of the character described, the combination of a car, a venting valve connected with the air-brake system of the car, a frame adjacent the valve, a vertically movable rod guided in said frame, connections between the rod and valve lever, a spring for upholding the rod in normal position, and means whereby said rod is operated by the car axle when the latter is derailed or unduly depressed.

4. A safety appliance for cars, comprising a venting valve connected with the air-brake system of the car, a vertically movable rod adjacent the valve, connections between said rod and the valve stem, means whereby excessive drop of the car axle will cause the rod to actuate the valve, and means for locking the rod when depressed to fully open the valve.

5. A safety appliance for cars, comprising a venting valve connected with the air-brake system of the car, a vertically movable rod suspended adjacent the valve and having an extension underlying the car axle, connections between said rod and the valve stem whereby excessive drop of the car axle will cause the rod to actuate the valve, and means for locking the rod when depressed to open the valve fully.

6. In a device of the character described, the combination of a car, and a venting valve connected with the air-brake system of the car; with a frame beside the valve, a rod guided in said frame, connections between said rod and valve lever, a spring for upholding the rod in normal position, means for locking the rod when depressed to open the valve fully; and means whereby said rod is operated from the car axle when the latter is derailed or unduly depressed.

7. In a device of the character described, the combination of a car, and a venting valve connected with the air brake system of the car; with a frame suspended from the car beside the valve, a vertically movable rod guided in said frame and having an extension under the axle whereby said rod is operated from the car axle when the latter is derailed or unduly depressed; connections between said rod and valve lever, a spring for upholding the rod in normal position, and means for locking the rod when depressed to open the valve fully.

In testimony that we claim the foregoing as our own, we affix our signatures in presence of two witnesses.

DANIEL N. BACOT.
DANIEL D. ARDEN.

In presence of—
 SAM MOORE,
 W. B. MOORE.